(12) United States Patent
Caicedo et al.

(10) Patent No.: US 9,071,551 B2
(45) Date of Patent: Jun. 30, 2015

(54) MOBILE TROUBLE TICKET

(71) Applicant: Cellco Partnership, Basking Ridge, NJ (US)

(72) Inventors: Luis Caicedo, Greenville, SC (US); Jason Williams, Greer, SC (US)

(73) Assignee: Cellco Partnership, Basking Ridge, NJ (US)

( * ) Notice: Subject to any disclaimer, the term of this patent is extended or adjusted under 35 U.S.C. 154(b) by 4 days.

(21) Appl. No.: 13/960,423

(22) Filed: Aug. 6, 2013

(65) Prior Publication Data

US 2015/0046578 A1 Feb. 12, 2015

(51) Int. Cl.
*H04L 12/24* (2006.01)
*H04L 29/08* (2006.01)

(52) U.S. Cl.
CPC ........ *H04L 41/5074* (2013.01); *H04L 67/2809* (2013.01)

(58) Field of Classification Search
USPC ................... 455/419, 423, 466, 566
See application file for complete search history.

(56) References Cited

U.S. PATENT DOCUMENTS

2008/0039122 A1* 2/2008 Coelho .......................... 455/466

OTHER PUBLICATIONS

BMC Software, Inc., "BMC Remedy Self-Service", www.bmc.com/products/offering/bmc-self-service-package.html, Feb. 15, 2013, 2 pages.
BMC Software, "BMC Virtual Agent", http://documents.bmc.com/products/documents/91/27/439127/439127.pdf, Sep. 2012, 2 pages.
BMC Software, Inc., Mobility for ITSM & Mobile Help Desk, www.bmc.com/products/mobile-help-desk/mobility-for-itsm.html, Jun. 8, 2012, 2 pages.
BMC Software, "BMC Mobility for IT Service Management", http://documents.bmc.com/products/documents/40/33/264033/264033.pdf, Mar. 2010, 4 pages.
BMC Software, "BMC Service Request Management", http://documents.bmc.com/products/documents/21/70/302170/302170.pdf, Mar. 2010, 2 pages.
BMC Software, "BMC Remedy Action Request System", http://documents.bmc.com/products/documents/84/67/98467/98467.pdf, Mar. 2009, 2 pages.
AT&T Services, Inc., "AT&T Mark the Spot", https://itunes.apple.com/us/app/at-t-mark-the-spot/id338307313?mt=8, Mar. 14, 2013, 3 pages.
AT&T Wireless Support, "Report Dropped Calls and Wireless Network Issues", www.att.com/esupport/article.jsp?sid=KB106170&cv=820#fbid=yjHnVvjOqJM, Jul. 22, 2013, 1 page.
AT&T Wireless Support, "Using the AT&T Mark the Spot Application", www.att.com/esupport/article.jsp?sid=KB108024#fbid=yjHnVvjOqJM, Jul. 22, 2013, 2 pages.
Mark Austin et al., "The Official Story on AT&T Mark the Spot", http://www.research.att.com/articles/featured_stories/2010_09/201009_MTS.html?fbid=xWvT1ZNGXSV, Oct. 5, 2010, 5 pages.

* cited by examiner

*Primary Examiner* — Sam Bhattacharya

(57) ABSTRACT

A device is configured to determine that the device is experiencing a problem, and to determine a problem type associated with the problem. The device is configured to determine a set of questions, based on the problem type, and to provide the set of questions to a user of the device. The device is configured to receive user input including responses to the set of questions. The device is configured to determine device information associated with one or more hardware components, hardware attributes, or software attributes associated with the user device. The device is configured to generate a trouble ticket based on the set of questions, the user input and the device information, and to transmit the trouble ticket.

20 Claims, 9 Drawing Sheets

MOBILE TROUBLE TICKET

BACKGROUND

A communication device (e.g., a cellular telephone, a smartphone, a computing device, etc.) may experience a technical problem, such as a dropped call, a low network signal, a fluctuating network signal, or the like. Technicians tasked with addressing the problem may gather information about the problem, the communication device, a user associated with the communication device, or the like.

DETAILED DESCRIPTION OF PREFERRED EMBODIMENTS

The following detailed description of example implementations refers to the accompanying drawings. The same reference numbers in different drawings may identify the same or similar elements.

A user device, such as a cellular telephone, a smartphone, a computing device, or the like, may experience a technical problem. The technical problem may include a malfunction of the user device and/or an associated network (e.g., a cellular network). For example, the technical problem may include a dropped call, a low signal strength, a fluctuating signal, or the like. A user associated with the user device may contact a technician (e.g., technical support personnel) associated with a user device manufacturer, a network service provider, or the like. The technician may gather information about the problem and may generate a trouble ticket for use in resolving the problem.

However, the technician must rely on information provided by the user (e.g., via a telephone call) who may not have easy access to some information about the user device and/or the problem (e.g., a device serial number, an operating software type, a current device signal strength, etc.). Further, this process of generating a trouble ticket may not be efficient as the process requires the user to place a call to the technician and recite information about the problem. Implementations described herein may allow a user device to generate a trouble ticket by determining answers to a set of questions specific to the problem type, and by gathering information about the user device not easily determined by the user.

Figure 1:
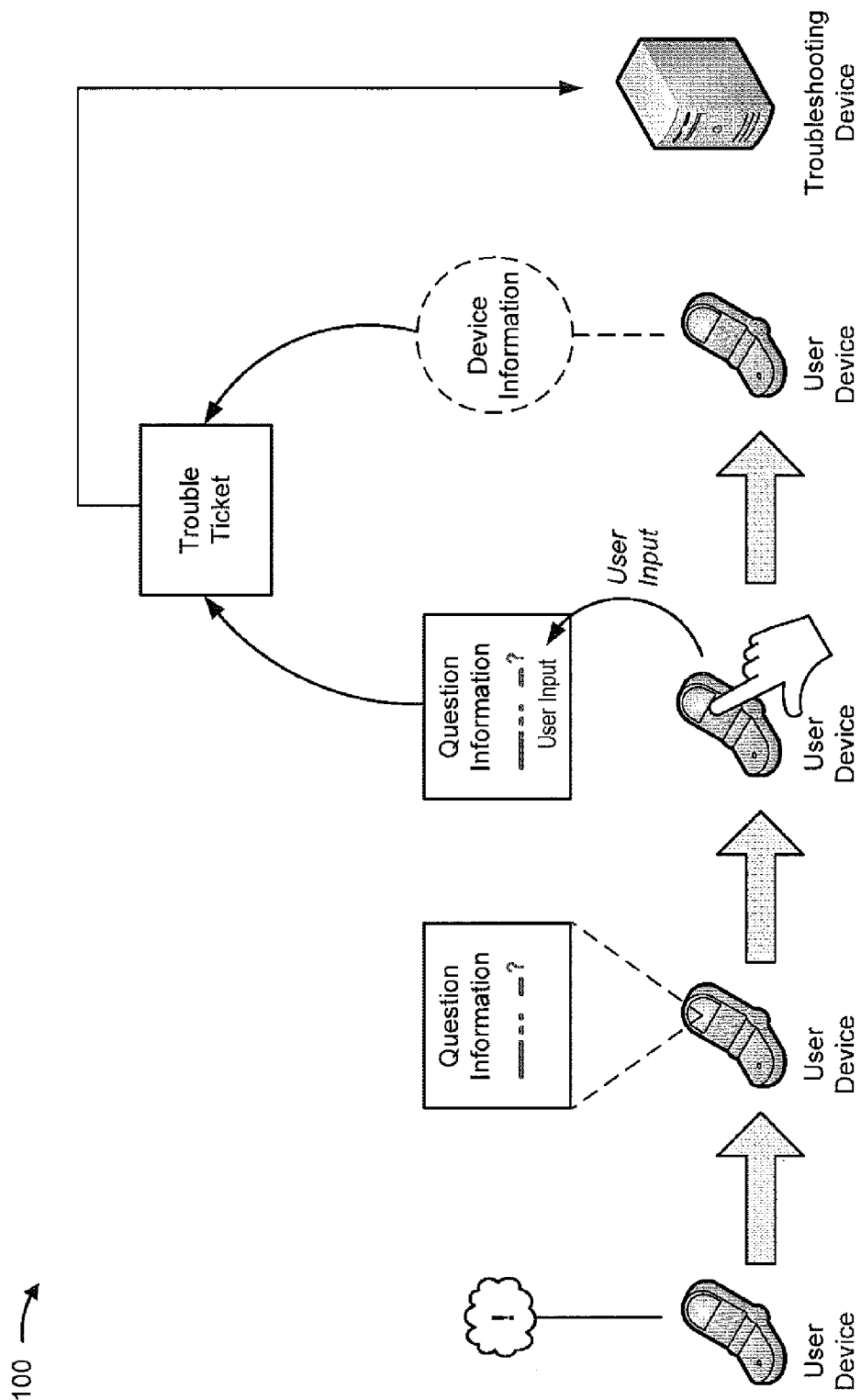
FIG. 1 is a diagram of an overview of an example implementation described herein.

FIG. 1 is a diagram of an example implementation 100 described herein. As shown in FIG. 1, example implementation 100 may include a user device, such as a smartphone. The user device may experience a problem, and may generate a trouble ticket associated with the problem.

As shown in FIG. 1, a user device may experience a problem (e.g., a technical problem). Based on the type of problem, the user device may provide question information. The question information may include a set of questions based on the problem type (e.g., a set of questions to elicit information about the problem). The user device may receive user input from a user of the user device. The user input may include responses to the set of questions.

As further shown in FIG. 1, the user device may determine device information. The device information may include information about the device. Based on the question information and based on the device information, the user device may generate a trouble ticket. The trouble ticket may include the set of questions, the user input, and information about the user device. The user device may send the trouble ticket to a troubleshooting device. In this manner, the user device may efficiently generate a trouble ticket that includes information about the problem and the user device. As a result, the troubleshooting device may resolve the problem in an efficient, cost-saving manner (e.g., due to a reduced need for a human agent to generate the trouble ticket, due to a reduced volume of service calls from user devices, etc.).

Figure 2:
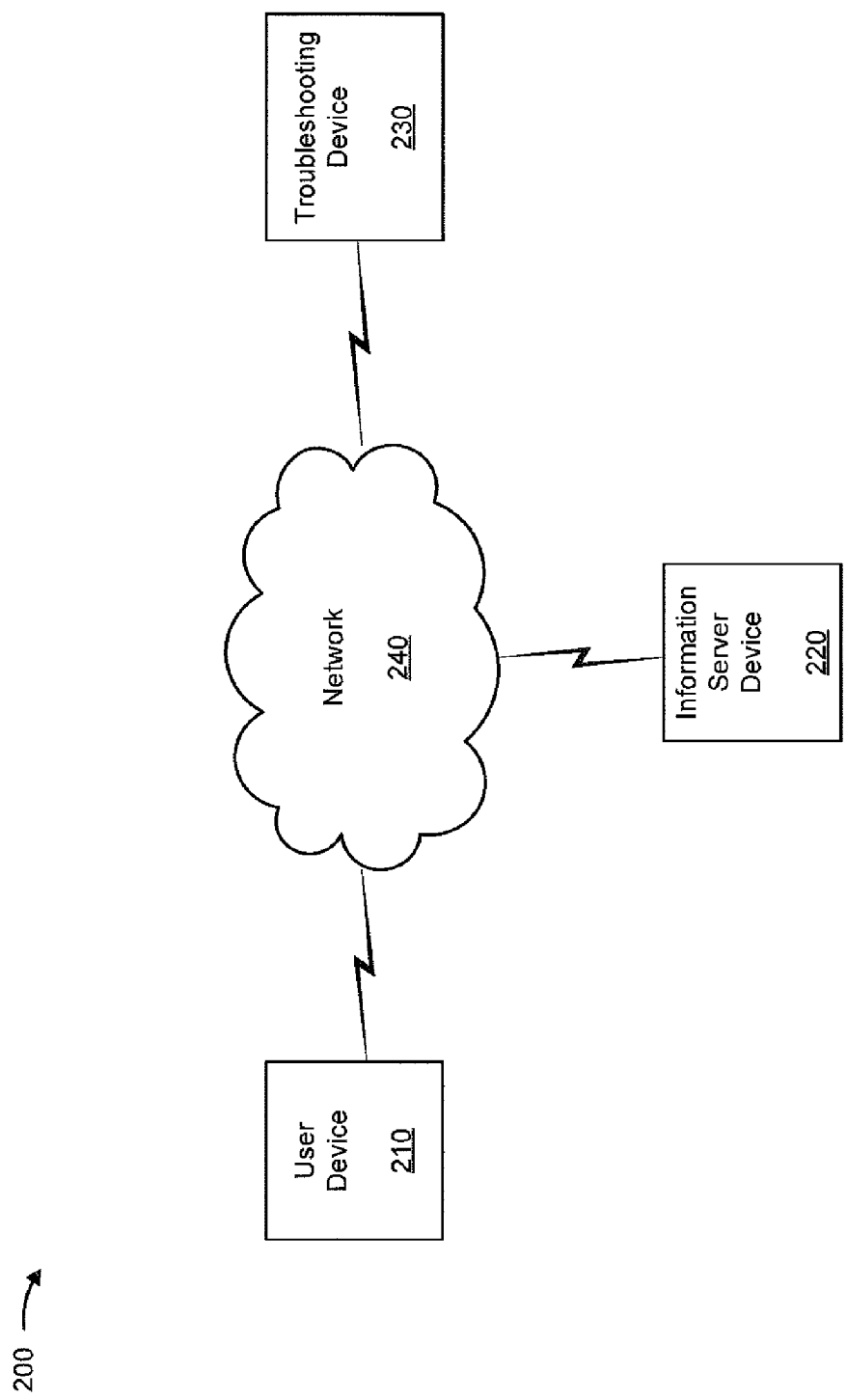
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an information server device 220, a troubleshooting device 230, and a network 240. Devices of environment 200 may interconnect via wired connections, wireless connections, or a combination of wired and wireless connections.

User device 210 may include a device capable of receiving, processing, storing, and/or transmitting information, such as information associated with a problem (e.g., a technical problem). For example, user device 210 may include a mobile telephone (e.g., a cellular telephone, a smartphone, a radiotelephone, etc.), a computing device (e.g., a desktop computer, a laptop computer, a tablet computer, a handheld computer, etc.), or a similar device. User device 210 may receive information from and/or transmit information to information server device 220 and/or troubleshooting device 230.

Information server device 220 may include one or more devices capable of receiving, storing, processing, and/or transmitting information, such as information associated with a problem (e.g., a technical problem). For example, information server device 220 may include a computing device, such as a server, a desktop computer, a laptop computer, a tablet computer, a handheld computer, or a similar device. Additionally, or alternatively, information server device 220 may receive information from and/or transmit information to user device 210 and/or troubleshooting device 230.

Troubleshooting device 230 may include one or more devices capable of receiving, storing, processing, and/or transmitting information, such as information associated with a problem (e.g., a technical problem). For example, troubleshooting device 230 may include a computing device, such as a server, a desktop computer, a laptop computer, a tablet computer, a handheld computer, or a similar device. In some implementations, troubleshooting device 230 may be associated with a call center. Additionally, or alternatively, troubleshooting device 230 may receive information from and/or transmit information to user device 210 and/or troubleshooting device 230.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
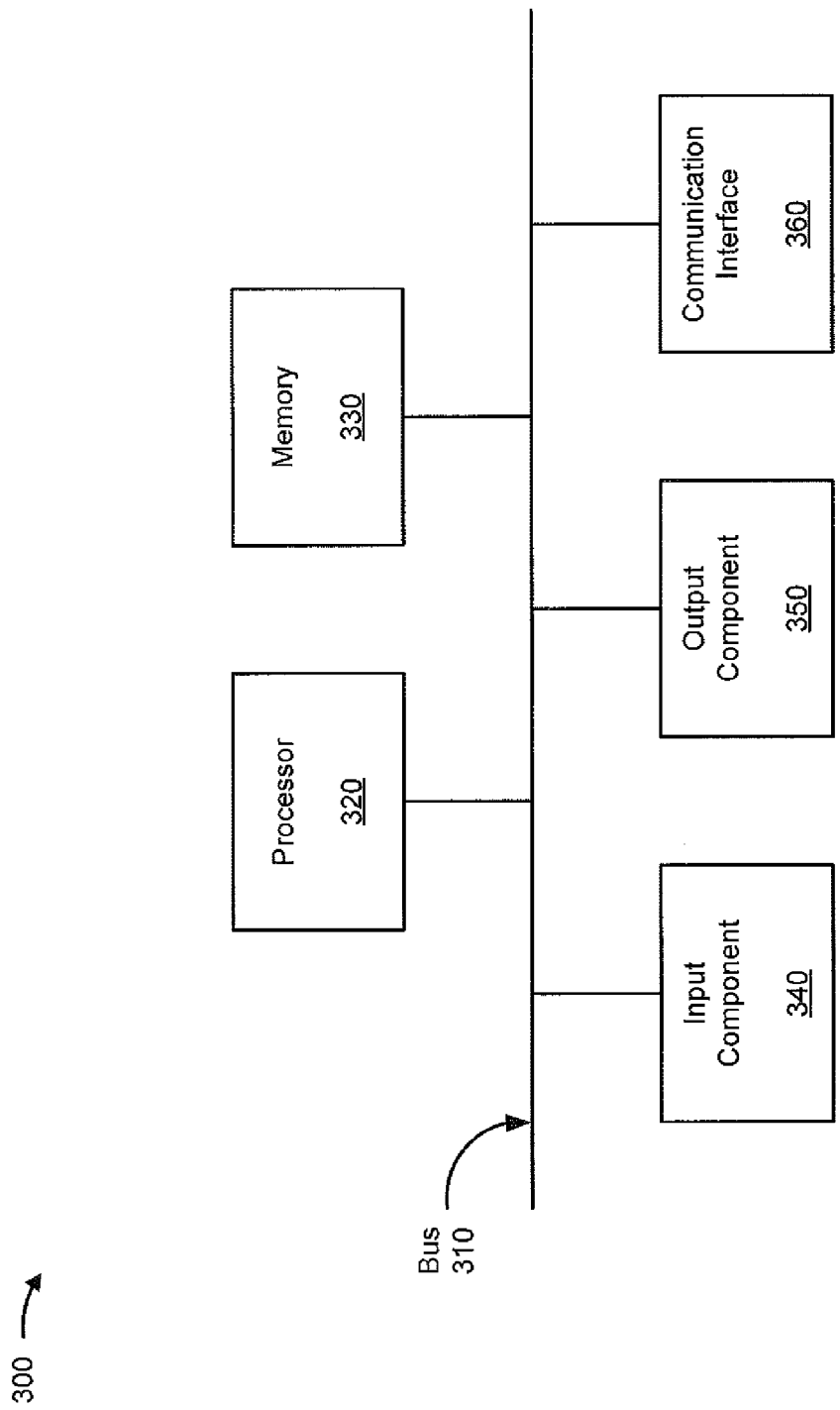
FIG. 3 is a diagram of example components of one or more devices of FIG. 2.

FIG. 3 is a diagram of example components of a device 300. Device 300 may correspond to user device 210, information server device 220, and/or troubleshooting device 230. Additionally, or alternatively, each of user device 210, information server device 220, and/or troubleshooting device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
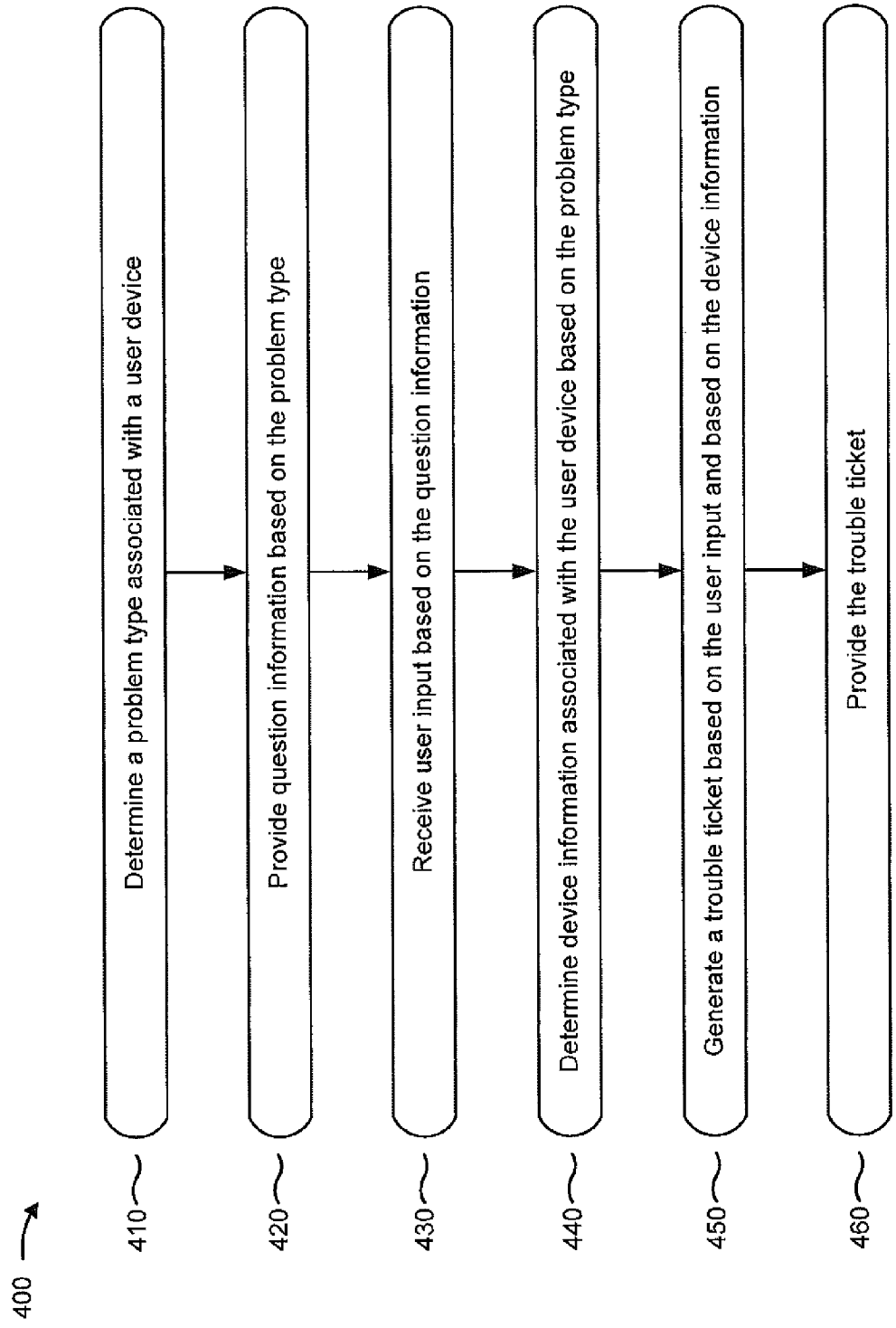
FIG. 4 is a flow chart of an example process for generating a trouble ticket.

FIG. 4 is a flow chart of an example process 400 for generating a trouble ticket. In some implementations, one or more process blocks of FIG. 4 may be performed by user device 210. Additionally, or alternatively, one or more process blocks of FIG. 4 may be performed by another device or a group of devices separate from or including user device 210, such as information server device 220 and/or troubleshooting device 230.

As shown in FIG. 4, process 400 may include determining a problem type associated with a device (block 410). For example, user device 210 may experience a problem (e.g., a technical problem), and may determine a problem type associated with the problem.

In some implementations, the problem type may include information that identifies a problem and/or a variety of problems (e.g., a kind of problem, a classification of problems, etc.) associated with user device 210. For example, the problem type may include one or more dropped calls experienced by user device 210, one or more fluctuating signals experienced by user device 210, one or more periods of low signal strength experienced by user device 210, or the like. Additionally, or alternatively, the problem type may include an inability to connect to a network (e.g., a WiFi network), difficulty sending and/or receiving information (e.g., information associated with the Internet), or the like. In some implementations, the problem type may include user device 210 freezing, restarting, running out of power (e.g., a low battery life), or the like.

In some implementations, user device 210 may determine the problem type by use of a troubleshooting application (e.g., a smartphone application). For example, the troubleshooting application may determine that user device 210 is associated with a dropped call, a fluctuating signal, a low signal strength, or the like. In some implementations, user device 210 may determine the problem type by determining that an attribute of user device 210 satisfies a threshold. For example, user device 210 may determine, via the troubleshooting application, that an attribute associated with user device 210 (e.g., a signal strength) fails to reach a threshold value (e.g., a minimum signal strength) during a given period of time.

In some implementations, the troubleshooting application may automatically determine that user device 210 is experiencing a problem. For example, the troubleshooting application may monitor user device 210, and may determine when user device 210 is experiencing a problem (e.g., a dropped call, a fluctuating signal, a low signal strength, etc.). In some implementations, the troubleshooting application may determine a problem and may receive user input confirming the problem (e.g., from a user of user device 210). Additionally, or alternatively, the user of user device 210 may activate the troubleshooting application when the problem occurs, and the troubleshooting application may monitor the problem.

In some implementations, the troubleshooting application may generate a performance history associated with behaviors of user device 210 (e.g., may monitor user device 210 and may store the performance history in a data structure associated with user device 210). Additionally, or alternatively, the troubleshooting application (e.g., user device 210) may receive information associated with a problem from a network device associated with network 240, such as a quantity of dropped calls associated with user device 210, a number of incomplete calls associated with user device 210, or the like.

In some implementations, user device 210 may receive the troubleshooting application from information server device 220 via an application store (e.g., by downloading the troubleshooting application from an online repository of smartphone applications). Additionally, or alternatively, user device 210 may receive a hyperlink (e.g., via a short message service ("SMS") text message, an email, etc.) to an internet website from which user device 210 may download the troubleshooting application. For example, a user of user device 210 may contact troubleshooting device 230 (e.g., a call center) via a voice call to report the problem. Troubleshooting device 230 may provide an email to user device 210 with the hyperlink to allow user device 210 to download the troubleshooting application. Additionally, or alternatively, user device 210 may include the troubleshooting application when purchased by a user of user device 210 (e.g., the troubleshooting application may be preinstalled).

In some implementations, user device 210 may determine the problem type based on user input. For example, a user of user device 210 may provide user input via a user interface associated with user device 210. The user input may identify the problem type. In some implementations, the user may provide the user input via the troubleshooting application. For example, the user may select, from a set of options, the problem type that identifies the problem. Additionally, or alternatively, the user may provide information (e.g., via the troubleshooting application) that describes the problem. Based on the information describing the problem, user device 210 may determine the problem type.

As further shown in FIG. 4, process 400 may include providing question information based on the problem type (block 420). For example, user device 210 may provide question information via a display associated with user device 210.

In some implementations, the question information may include a set of questions associated with the problem type (e.g., a dropped call, a fluctuating signal, a low signal strength, etc.). For example, the question information may include a set of questions designed to gather information about a particular problem (e.g., suited to the problem type). In some implementations, the set of questions may include questions associated with a start and/or an end time of the problem, a duration of the problem, a location of the problem, or the like.

In some implementations, user device 210 may store a set of questions associated with a set of problem types. Based on the problem type (e.g., the problem type determined by user device 210), user device 210 may provide those questions pertaining to the problem type (e.g., user device 210 may provide a subset of questions, of the set of questions, that are associated with the problem).

In some implementations, user device 210 may receive the question information from information server device 220. For example, user device 210 may determine the problem type, and may send a notification to information server device 220 that identifies the problem type. Based on the notification (e.g., based on the problem type), information server device 220 may provide a set of questions associated with the problem type. User device 210 may receive the set of questions from server device 220, and may provide the set of questions for display to the user.

In some implementations, user device 210 may provide the question information via a user interface associated with user device 210 (e.g., a screen, a display, etc.). For example, user device 210 may provide a set of questions for display on user device 210. Additionally, or alternatively, user device 210 may provide the question information by use of a troubleshooting application. For example, user device 210 may run the troubleshooting application, and may provide the set of questions via the troubleshooting application.

As further shown in FIG. 4, process 400 may include receiving user input based on the question information (block 430). For example, a user of user device 210 may view the question information (e.g., via a user interface), and may provide user input based on the question information. In some implementations, the user may provide user input via the user interface (e.g., via a keypad, a microphone, QWERTY keyboard, a touchscreen, etc.).

In some implementations, the user input may include a description of a problem (e.g., identified by the problem type). For example, the user input may include a narrative of the problem and/or circumstances relating to the problem.

In some implementations, the user input may include one or more responses to a set of questions (e.g., the set of questions determined based on the problem type). For example, user device 210 may provide a question, and the user may provide user input (e.g., via the user interface) in response to the question. Additionally, or alternatively, the user input may include a user selection. For example, user device 210 may provide a set of options (e.g., a set of possible responses to a question) and the user may select one or more of the options.

In some implementations, user device 210 may modify the set of questions based on the user input (e.g., based on the responses). For example, user device 210 may receive responses to a portion of a set of questions associated with a problem type (e.g., a dropped call). Based on a response to a question (e.g., based on the user indicating that dropped calls only occur indoors), user device 210 may remove a subset of questions from the set of questions (e.g., questions that ask about dropped calls occurring outdoors). In this manner, user device 210 may add a question, may remove a question, and/or may modify a question based on the user's response to a previous question.

In some implementations, the user input may include information associated with the user (e.g., the user of user device 210). For example, the user input may include contact information associated with the user (e.g., a user identifier, a user telephone number, a user email address, a user address, etc.), a location of the user (e.g., a home address, an address associated with the problem, etc.), or the like.

As further shown in FIG. 4, process 400 may include determining device information associated with the device based on the problem type (block 440). For example, user device 210 may determine device information that identifies a technical attribute of user device 210 that relates to the problem type.

In some implementations, the device information may include information that identifies one or more hardware components and/or hardware attributes associated with user device 210. For example, the device information may identify a device type associated with user device 210 (e.g., whether user device 210 is a smartphone, a cellular phone, a computing device, etc.), a model type associated with user device 210 (e.g., a smartphone model), an antenna type associated with user device 210, a battery type associated with user device 210, or the like. Additionally, or alternatively, the device information may include information that identifies one or more software components and/or software attributes associated with user device 210. For example, the device information may identify an operating system associated with user device 210, a software program associated with user device 210, an application associated with user device 210, or the like.

In some implementations, the device information may include information that identifies user device 210. For example, the device information may include a serial number associated with user device 210, an internet protocol ("IP") address associated with user device 210, a telephone number associated with user device 210, a mobile directory number ("MDN") associated with user device 210, or the like. Additionally, or alternatively, the device information may include information that identifies a geographic location of user device 210 (e.g., via a set of global positioning system ("GPS") coordinates), a time associated with user device 210 (e.g., a date associated with the problem), or the like.

In some implementations, the device information may include current attributes of user device 210 (e.g., attributes associated with user device 210 at the time of generating a trouble ticket). For example, the device information may identify a network status associated with user device 210 (e.g., whether user device 210 is roaming), a signal strength associated with user device 210 (e.g., a quantity of signal strength bars, a received signal strength indicator ("RSSI") value, etc.), a network type associated with user device 210 (e.g., whether user device 210 is connected to a WiFi network, a third generation ("3G") network, a fourth generation ("4G") network, a long term evolution ("LTE") network, etc.), or the like. Additionally, or alternatively, the device information may include a history of attributes of user device 210 during a period of time (e.g., an hour, a day, a week, etc.), such as a history of network statuses, a history of signal strengths, a history of network types, a history of battery power usage, or the like.

In some implementations, the device information may include information associated with the user of user device 210. For example, the device information may include information that identifies a purchase date associated with user device 210, a history of previous reported problems associated with user device 210, a service provider associated with user device 210, subscription information associated with user device 210, or the like. In some implementations, user device 210 may receive the user information from information server device 220. For example, user device 210 may send a notification to information server device 220 (e.g., a query for user information), and information server device 220 may provide the user information based on the notification.

As further shown in FIG. 4, process 400 may include generating a trouble ticket based on the user input and based on the device information (block 450). For example, user device 210 may generate a trouble ticket that includes the user input and the device information.

In some implementations, the trouble ticket may include information associated with a problem identified by the problem type. For example, the trouble ticket may include the problem type, the question information, the user information, and/or the device information.

In some implementations, user device 210 may generate the trouble ticket by generating an email that includes the user input and/or the device information. For example, user device 210 may generate an email that may include responses provided by a user of user device 210 in response to a set of questions associated with the problem type. Additionally, or alternatively, user device 210 may generate an email that includes device information, such as a type of user device 210, a signal strength associated with user device 210, or the like. In some implementations, the trouble ticket may include user input and/or device information within the text of the email. Additionally, or alternatively, the trouble ticket may include a file attached to the email.

In some implementations, user device 210 may generate the email by use of an email client associated with user device 210 (e.g., the email client associated with the user). In some implementations, user device 210 may receive user input identifying the email client. For example, a user of user device 210 may provide user input selecting which email client, of a set of email clients associated with user device 210, to use to generate the trouble ticket. Additionally, or alternatively, user device 210 may determine the email client automatically (e.g., based on a business rule, a predetermined selection, a previous association, etc.).

In some implementations, user device 210 may generate the trouble ticket by use of the troubleshooting application. For example, the troubleshooting application may generate a file that includes the user input information and/or the device information. Additionally, or alternatively, user device 210 may store the trouble ticket (e.g., the file) in a data structure associated with user device 210. In some implementations, user device 210 may generate the trouble ticket based on standards associated with troubleshooting device 230. For example, user device 210 may format the trouble ticket to be compatible with the standards (e.g., may format the email, may format the file, etc. for processing by troubleshooting device 230).

In some implementations, user device 210 may verify that necessary user input has been provided by the user. For example, user device 210 may verify that the user has provided information for all fields associated with the question information (e.g., that the user has responded to all questions). Additionally, or alternatively, user device 210 may ask the user (e.g., via a message) to verify information associated with the trouble ticket. For example, user device 210 may provide a message asking the user to review information associated with the email. In some implementations, user device 210 may receive a confirmation from the user (e.g., by user input via the user interface) indicating that the user has reviewed the trouble ticket.

As further shown in FIG. 4, process 400 may include providing the trouble ticket (block 460). For example, user device 210 may provide the trouble ticket to troubleshooting device 230.

In some implementations, user device 210 may provide the trouble ticket by sending a file to troubleshooting device 230. For example, a troubleshooting application may provide the file to troubleshooting device 230 via network 240. Additionally, or alternatively, user device 210 may provide the trouble ticket by sending an email to troubleshooting device 230 (e.g., an email associated with the trouble ticket). In some implementations, user device 210 may send the email automatically. Additionally, or alternatively, user device 210 may send the email to troubleshooting device 230 based on user input (e.g., based on a user of user device 210 providing input to send the email).

In some implementations, user device 210 may provide an indication that user device 210 has provided the trouble ticket to troubleshooting device 230. For example, user device 210 may provide a message (e.g., on a user interface) indicating that the trouble ticket has been sent to the troubleshooting device. In some implementations, the message may include an indication of how long it may take to resolve the problem and/or how the user may expect to receive an indication that the problem is resolved. Additionally, or alternatively, user device 210 may receive a notification from troubleshooting device 230. The notification may indicate that the problem is resolved, may identify steps to be taken by user device 210 and/or the user to resolve the problem, or the like.

In some implementations, troubleshooting device 230 may use the trouble ticket to address the problem. For example, an operator of troubleshooting device 230 (e.g., a technician, an engineer, a customer service representative, etc.) may view the trouble ticket, and may address the problem identified in the trouble ticket. In some implementations, the trouble ticket may include an email, and the operator of troubleshooting device 230 may receive the email. Additionally, or alternatively, troubleshooting device 239 may receive the trouble ticket, and may generate an internal trouble ticket based on the trouble ticket (e.g., a document, a file, an email, etc., for use by an operator associated with troubleshooting device 230).

In some implementations, troubleshooting device 230 may analyze the contents of the trouble ticket to determine the problem identified in the trouble ticket, and may provide the trouble ticket received from user device 210 to a particular entity (e.g., a technician, a department, etc.) based on the problem identified in the trouble ticket. For example, troubleshooting device 230 may provide the trouble ticket to a technician (e.g., a technician trained to solve problems associated with a fluctuating signal) based on the problem (e.g., the fluctuating signal). Additionally, or alternatively, user device 210 may analyze the contents of the trouble ticket to determine the problem identified in the trouble ticket, and may provide the trouble ticket to the particular entity based on the problem (e.g., user device 210 may send an email associated with the trouble ticket to a technician with expertise relating to the problem). In some implementations, the trouble ticket may be formatted to populate a report associated with particular entity (e.g., a document, a file, a workflow manager, etc.).

In some implementations, troubleshooting device 230 may correlate the trouble ticket with other trouble tickets associated with other user devices 210. Troubleshooting device 230 may use the correlated trouble tickets to identify patterns (e.g., among user devices 210) that indicate problems with a network (e.g., network 240), problems with a set of batteries associated with user devices 210, problems with models of user devices 210, problems with software associated with user device 210, or the like.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5A:
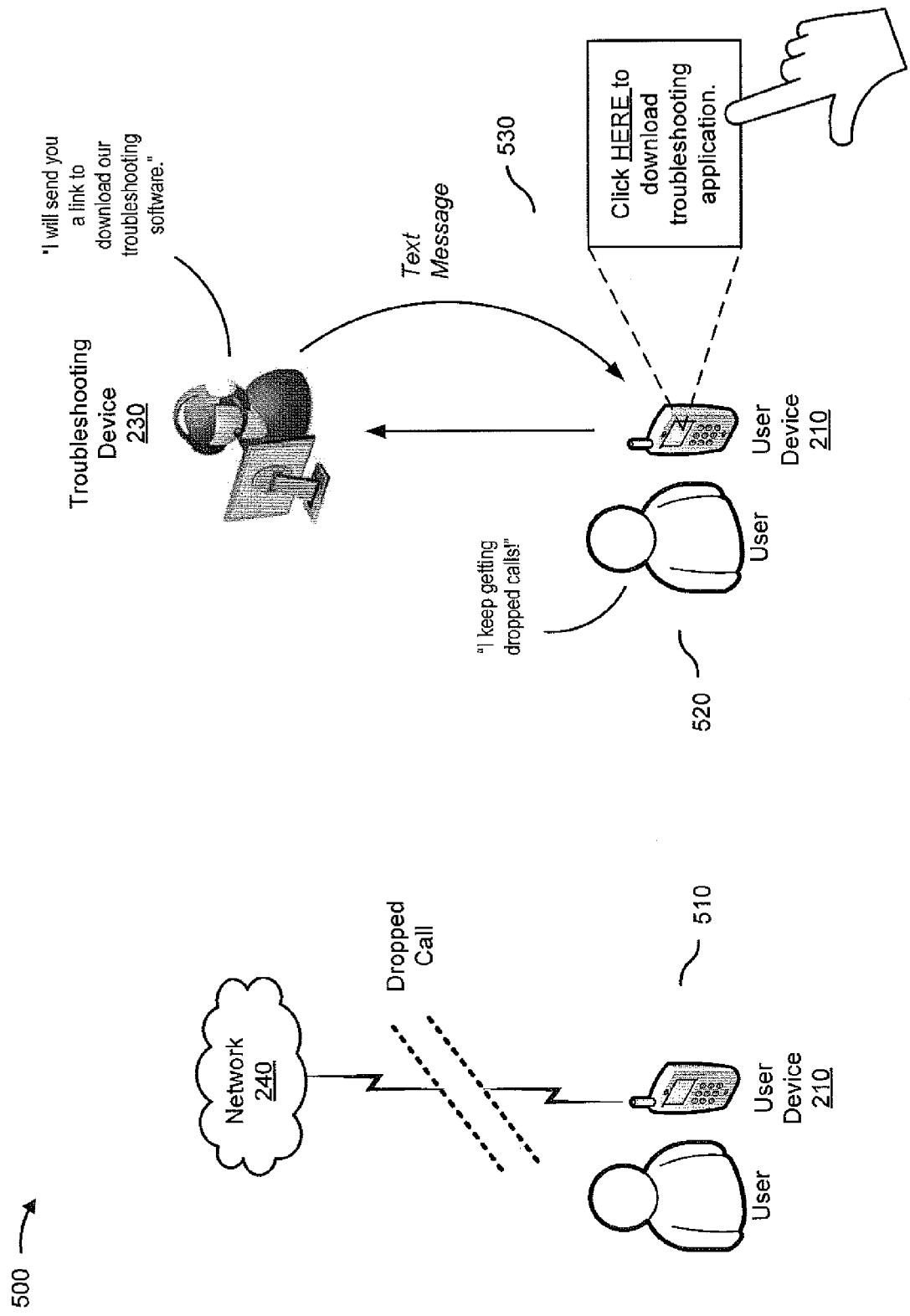
FIGS. 5A-5C are diagrams of an example implementation relating to the example process shown in FIG. 4.
Figure 5B:
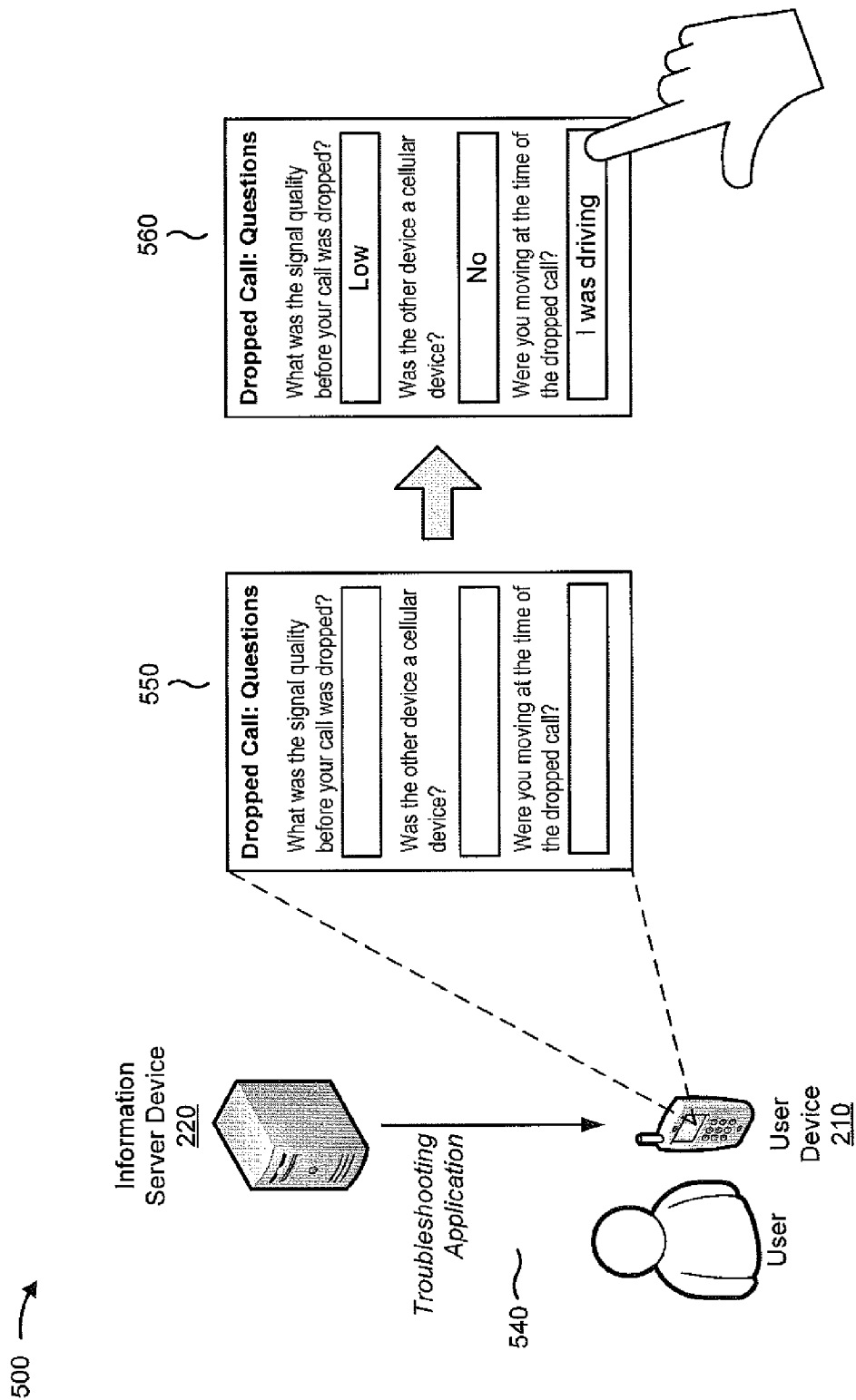

FIGS. 5A-5B are diagrams of an example implementation 500 relating to process 400 (FIG. 4). In example implementation 500, user device 210 may generate a trouble ticket associated with a problem (e.g., a dropped call).

As shown in FIG. 5A, and by reference number 510, user device 210 may unexpectedly disconnect from network 240 during a telephone call (e.g., user device 210 may experience a dropped call). As shown by reference number 520, a user of user device 210 may place a telephone call to troubleshooting device 230 (e.g., a call center for troubleshooting problems with user device 210). By communicating with the user, troubleshooting device 230 may determine a problem type (e.g., that user device 210 is experiencing dropped calls). As shown by reference number 530, troubleshooting device 230 may send a text message to user device 210. The text message may include a link (e.g., a hyperlink) to a troubleshooting application.

As shown in FIG. 5B, and by reference number 540, user device 210 may receive the troubleshooting application from information server device 220 (e.g., by following the link provided in the text message). The troubleshooting application may present a set of questions associated with dropped calls.

As shown by reference number 550, user device 210 may display the set of questions on a user interface associated with user device 210. The set of questions may include questions about the signal quality when the call was dropped, whether the other device was a cellular device, and whether user device 210 was moving when the call was dropped. As shown by reference number 560, the user may answer the set of questions by providing user input via the user interface associated with user device 210.

Figure 5C:
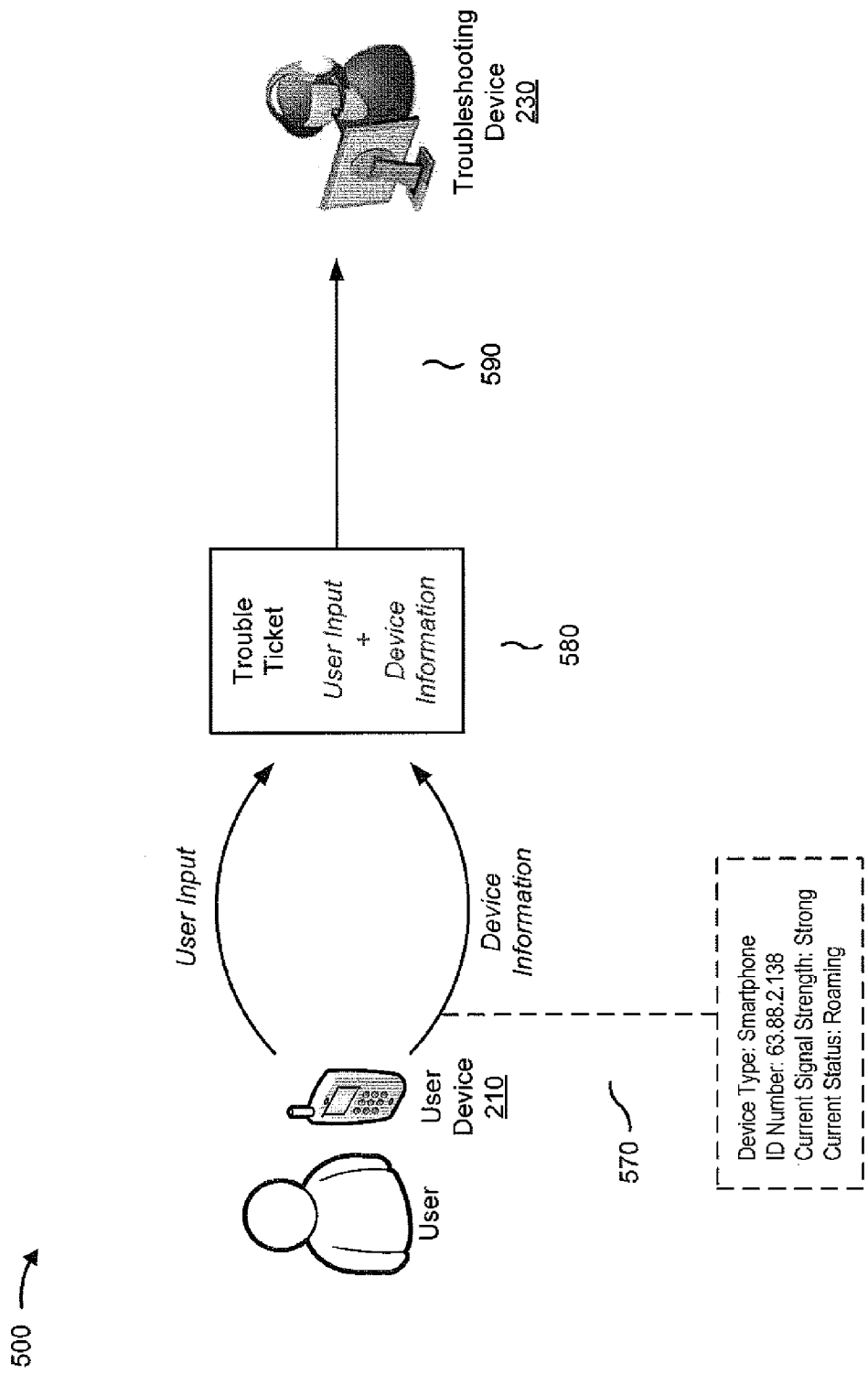

As shown in FIG. 5C, and by reference number 570, user device 210 may determine device information associated with user device 210. The device information may include a device type (e.g., "Smartphone"), an identification number (e.g., "63.88.2.138"), a current signal strength (e.g., "Strong"), and a current status (e.g., "Roaming"). As shown by reference number 580, user device 210 may generate a trouble ticket based on the user input (e.g., responses to the set of questions) and based on the device information. The trouble ticket may include a file that includes the user input and the device information. User device 210 may send the trouble ticket to troubleshooting device 230, as shown by reference number 590.

As indicated above, FIGS. 5A-5C are provided merely as an example. Other examples are possible and may differ from what was described with regard to FIGS. 5A-5C.

Figure 6A:
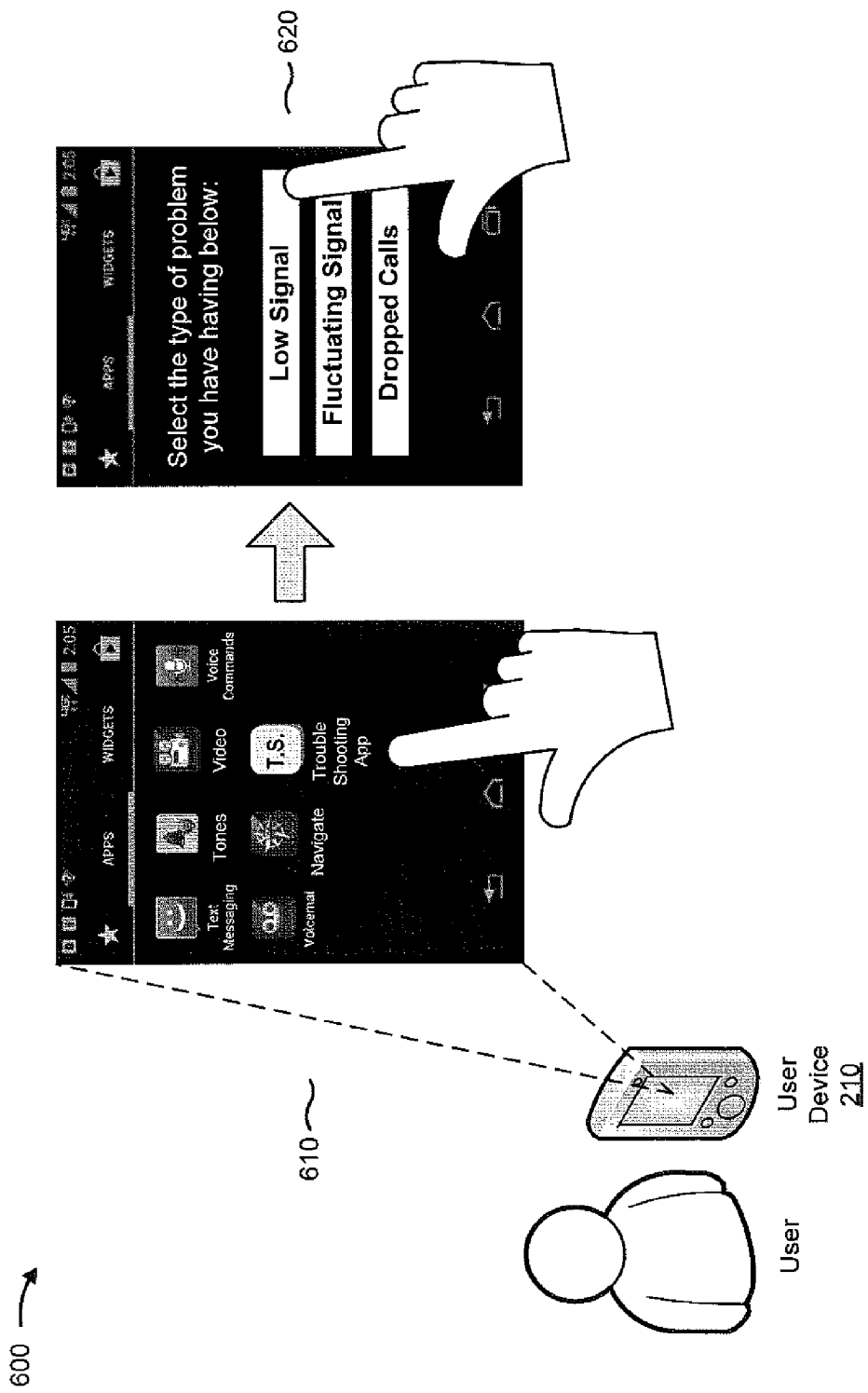
FIGS. 6A-6B are diagrams of another example implementation relating to the example process shown in FIG. 4.
Figure 6B:
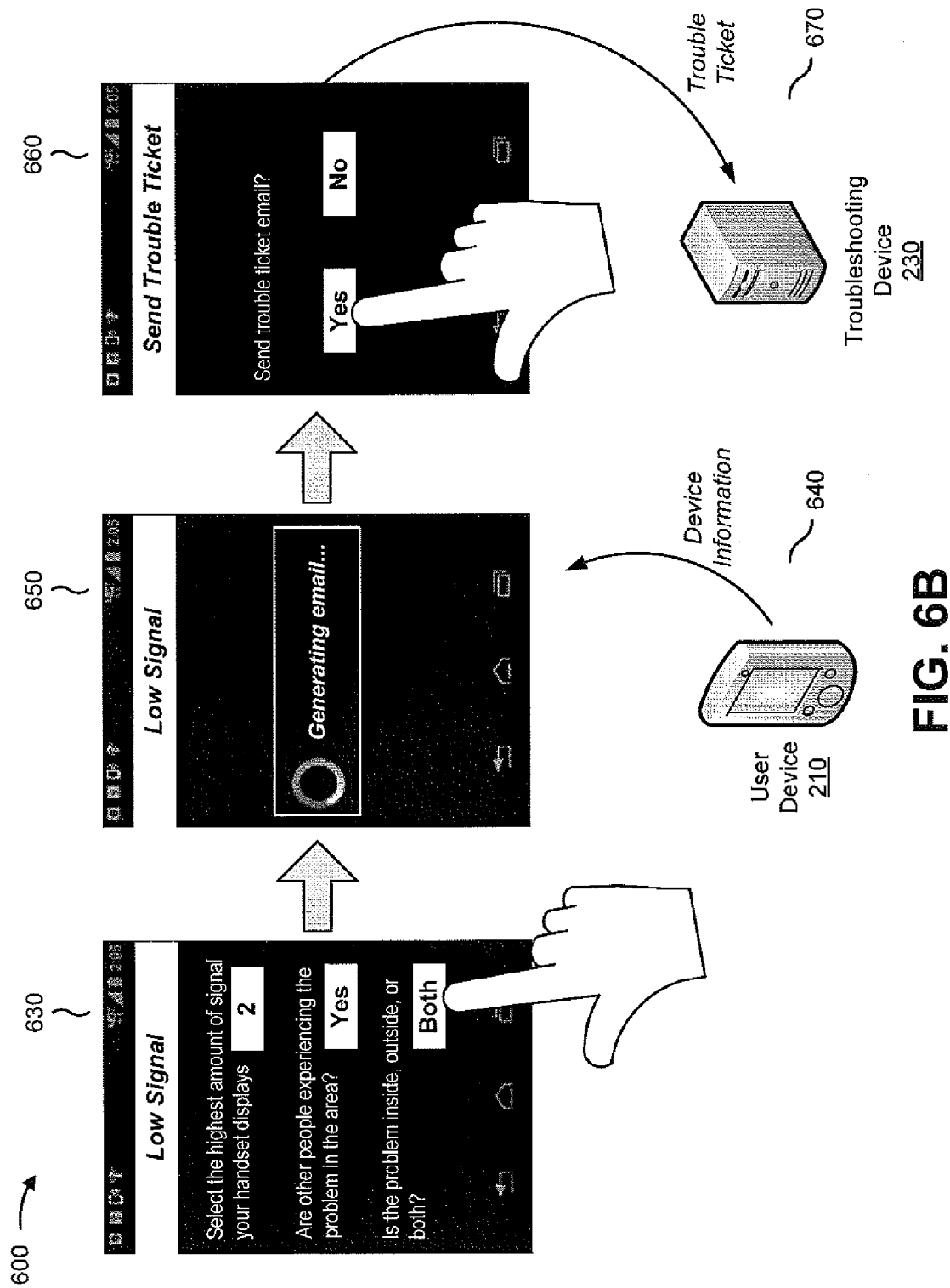

FIGS. 6A-6B are diagrams of another example implementation 600 relating to process 400 (FIG. 4). In example implementation 600, a user of user device 210 may experience a problem (e.g., a low signal strength). To report the problem, user device 210 may generate a trouble ticket by use of a smartphone application.

As shown in FIG. 6A, and by reference number 610, the user of user device 210 may select a troubleshooting application. The troubleshooting application may be preinstalled on user device 210. As shown by reference number 620, user device 210 may display, via a user interface of the troubleshooting application, a set of problem types (e.g., "low signal," "fluctuating signal," and "dropped calls"). User device 210 may determine the problem type by receiving user input via the user interface. The user may select one of the problem types (e.g., "low signal") by touching a region of a display corresponding to the problem type.

As shown in FIG. 6B, and by reference number 630, user device 210 may provide a set of questions based on the problem type. The set of questions may correspond to the problem (e.g., may be specific questions tailored to a user device 210 experiencing a low signal strength). The set of questions may include questions about a highest amount of signal strength experienced by user device 210, whether other people in the area are experiencing the same problem, and whether the problem is inside or outside. User device 210 may receive answers to the set of questions by user input from the user (e.g., the user may provide answers via the user interface associated with, and running on, user device 210).

As shown by reference number 640, user device 210 may determine device information based on the problem type. The device information may include a make of user device 210, a model of user device 210, a serial number of user device 210, a measure of signal strength associated with user device 210, or the like. As shown by reference number 650, user device 210, via the troubleshooting application, may generate a trouble ticket, based on the user input and based on the device information, by generating an email. User device 210 may generate the email by using an email client associated with user device 210 (e.g., by populating an email in an email client used by the user). User device 210 may specify a destination of the mail (e.g., an email address).

As shown by reference number 660, user device 210 may provide an option to send the trouble ticket (e.g., the email). Upon selection by the user to send the trouble ticket, user device 210 may provide the trouble ticket to troubleshooting device 230. In due course, an engineer associated with troubleshooting device 230 may analyze the trouble ticket and may address the problem (e.g., the low signal strength).

As indicated above, FIGS. 6A-6B are provided merely as an example. Other examples are possible and may differ from what was described with regard to FIGS. 6A-6B.

Implementations described herein may allow a user device to generate a trouble ticket by determining answers to a set of questions specific to the problem type, and by gathering information about the user device that may not be easily determined by a user of the user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

While the specification has used terms like "high," "low," "near," "far," etc., these terms are relative terms that are measured relative to a threshold or another item (e.g., a high item relative to a low item, a near item relative to a threshold, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A user device, comprising:
one or more processors to:
    determine that the user device is experiencing a problem;
    determine, based on determining that the user device is experiencing the problem, a problem type associated with the problem;
    determine a plurality of questions that relate to the problem type;
    provide the plurality of questions to a user of the user device;
    receive user input based on providing the plurality of questions to the user,
        the user input including responses to the plurality of questions;
    determine device information, associated with the user device, based on the problem type,
        the device information relating to:
            one or more hardware components associated with the user device,
            one or more hardware attributes associated with the user device,
            one or more software components associated with the user device, or
            one or more software attributes associated with the user device;
    generate a trouble ticket based on the plurality of questions, the user input, and the device information; and
    transmit the trouble ticket to a troubleshooting device to permit the problem to be addressed.

2. The user device of claim 1, where the one or more processors, when determining that the user device is experiencing a problem, are further to:
monitor the user device for a period of time, and
determine that the user device is experiencing the problem based on monitoring the user device for the period of time.

3. The user device of claim 1, where the one or more processors, when determining the plurality of questions, are further to:
receive a message that includes a hyperlink,
the hyperlink identifying a location for receiving the plurality of questions; and
receive the plurality of questions from the location identified by the hyperlink.

4. The user device of claim 1, where the one or more processors, when receiving the user input, are further to:
receive the user input corresponding to a question of the plurality of questions; and
remove another question, of the plurality of questions, based on the user input corresponding to the question.

5. The user device of claim 1, where the one or more processors, when determining the device information, are further to:
determine historical device information,
the historical device information including information associated with the problem over a period of time; and
where the one or more processors, when generating the trouble ticket, are further to:
generate the trouble ticket based on the historical device information.

6. The user device of claim 1, where the one or more processors, when generating the trouble ticket, are further to:
generate an email including the trouble ticket; and
where the one or more processors, when transmitting the trouble ticket, are further to:
send the email to the troubleshooting device.

7. The user device of claim 6, where the one or more processors, when generating the email, are further to:
receive user input from the user identifying an email client, from a plurality of email clients, associated with the user device; and
generate the email using the email client.

8. A non-transitory computer-readable medium storing instructions, the instructions comprising:
one or more instructions that, when executed by one or more processors associated with a user device, cause the one or more processors to:
determine that the user device is experiencing a problem;
determine, based on determining that the user device is experiencing the problem, a problem type associated with the problem;
determine question information based on the problem type,
the question information including a plurality of questions that relate to the problem type;
provide the question information for display;
receive user input based on providing the question information for display,
the user input including responses to the plurality of questions;
determine device information, associated with the user device, based on the problem type,
the device information relating to:
one or more hardware components associated with the user device,
one or more hardware attributes associated with the user device,
one or more software components associated with the user device, or
one or more software attributes associated with the user device;
generate a trouble ticket based on the question information, the user input, and the device information; and
transmit the trouble ticket to a troubleshooting device to permit the problem to be addressed.

9. The non-transitory computer-readable medium of claim 8, where the one or more instructions, that cause the one or more processors to determine that the user device is experiencing the problem, further cause the one or more processors to:
provide information regarding a plurality of problems to a user of the user device;
receive a user selection identifying the problem of the plurality of problems; and
determine the problem based on the users selection.

10. The non-transitory computer-readable medium of claim 8, where the one or more instructions, that cause the one or more processors to determine that the user device is experiencing the problem, further cause the one or more processors to:
determine user device performance parameters; and
automatically determine that the user device is experiencing the problem based on determining that the user device is not performing within the user device performance parameters.

11. The non-transitory computer-readable medium of claim 8, where the one or more instructions, that cause the one or more processors to generate the trouble ticket, further cause the one or more processors to:
generate the trouble ticket based on a format associated with the troubleshooting device; and
where the one or more instructions, that cause the one or more processors to transmit the trouble ticket, further cause the one or more processors to:
transmit the trouble ticket, to the troubleshooting device, in the format associated with the troubleshooting device.

12. The non-transitory computer-readable medium of claim 8, where the one or more instructions, that cause the one or more processors to determine the device information, further cause the one or more processors to:
determine user information associated with a user of the user device; and
where the one or more instructions, that cause the one or more processors to generate the trouble ticket, further cause the one or more processors to:
generate the trouble ticket based on the user information.

13. The non-transitory computer-readable medium of claim 8, where the one or more instructions, that cause the one or more processors to generate the trouble ticket, further cause the one or more processors to:
receive input indicating that a user of the user device has verified information associated with the trouble ticket; and
where the one or more instructions, that cause the one or more processors to transmit the trouble ticket, further cause the one or more processors to:
transmit the trouble ticket based on the input.

14. The non-transitory computer-readable medium of claim 8, where the one or more instructions, that cause the one or more processors to receive the user input based on providing the question information, further cause the one or more processors to:
determine an unanswered question of the plurality of questions; and
provide a notification that the unanswered question has not been answered.

15. A method, comprising:
- determining, by a user device, a problem type associated with a problem that the user device is experiencing;
- determining, by the user device, a plurality of questions that relate to the problem type;
- providing, by the user device, the plurality of questions to a user of the user device;
- receiving, by the user device, user input based on providing the plurality of questions to the user,
  - the user input including responses to the plurality of questions;
- determining, by the user device, device information, associated with the user device, based on the problem type, the device information relating to:
  - one or more hardware components associated with the user device,
  - one or more hardware attributes associated with the user device,
  - one or more software components associated with the user device, or
  - one or more software attributes associated with the user device;
- generating, by the user device, a trouble ticket based on the plurality of questions, the user input, and the device information; and
- transmitting, by the user device, the trouble ticket to a troubleshooting device to permit the problem to be addressed.

16. The method of claim 15, where providing the plurality of questions further comprises:
- determining a subset of questions, of the plurality of questions, associated with the problem type,
  - the subset of questions excluding questions, of the plurality of questions, not related to the problem type; and
- providing the subset of questions to the user.

17. The method of claim 15, where determining the device information further comprises:
- determining current attributes of the user device,
  - where the current attributes identify at least one of:
    - a current signal strength associated with the user device;
    - a current location associated with the user device; or
    - a current network associated with the user device; and
- where generating the trouble ticket further comprises:
  - generating the trouble ticket based on the current attributes.

18. The method of claim 15, where generating the trouble ticket further comprises:
- automatically populating a message with information for the trouble ticket; and
- where transmitting the trouble ticket further comprises:
  - transmitting the message to the troubleshooting device.

19. The method of claim 15, where generating the trouble ticket further comprises:
- determining an entity, associated with the troubleshooting device, to address the problem based on the problem type; and
- where transmitting the trouble ticket further comprises:
  - transmitting the trouble ticket to the entity.

20. The method of claim 15, where transmitting the trouble ticket further comprises:
- transmitting the trouble ticket to the troubleshooting device to cause the troubleshooting device to analyze a content of the trouble ticket; or
- transmitting the trouble ticket to the troubleshooting device to cause the troubleshooting device to determine an entity to address the problem based on a content of the trouble ticket.

* * * * *